United States Patent [19]

Bogacki

[11] Patent Number: 4,825,386

[45] Date of Patent: Apr. 25, 1989

[54] HORIZONTAL LINE PROCESSOR OF DATA TO BE PRINTED DOT SEQUENTIALLY

[75] Inventor: Anthony Bogacki, Chester, N.H.

[73] Assignee: Digital Equipment Corporation, Maynard, Mass.

[21] Appl. No.: 900,028

[22] Filed: Aug. 25, 1986

[51] Int. Cl.⁴ ............................................. G06F 15/40
[52] U.S. Cl. .................................. 364/518; 340/799; 340/750; 364/522
[58] Field of Search ............................. 364/518–522; 340/798–800, 703, 724, 731, 747, 750

[56] References Cited

U.S. PATENT DOCUMENTS

| | | | |
|---|---|---|---|
| 4,031,519 | 6/1977 | Findley | 364/900 |
| 4,300,206 | 11/1981 | Belleson | 364/900 |
| 4,628,467 | 12/1986 | Nishi et al. | 364/521 |
| 4,675,833 | 6/1987 | Cheek et al. | 364/522 X |
| 4,701,864 | 10/1987 | Takashima et al. | 364/521 |

FOREIGN PATENT DOCUMENTS 0100853 2/1984 European Pat. Off. .
0167165 1/1986 European Pat. Off. .

OTHER PUBLICATIONS

IBM Technical Disclosure Bulletin, vol. 22, No. 10, Mar. 1980, pp. 4710–4713.
IBM Technical Disclosure Bulletin, vol. 24, No. 2, Jul. 1981.

Primary Examiner—Gary V. Harkcom
Assistant Examiner—H. R. Herndon
Attorney, Agent, or Firm—Nutter, McClennen & Fish

[57] ABSTRACT

A horizontal line processor for loading print instruction commands into selected locations in a full page bit map memory. The horizontal line processor includes: a font memory for storing bit representations of print instruction commands; a means for receiving commands indicating the type of operation and the location of an operation to be performed on the printing instructions in the full page bit map memory; a sequencer for controlling the horizontal line processor in response to the instructions; an address control unit for incrementally and sequentially generating the addresses of full page bit map memory locations where the printing instructions are to be modified, and the addresses of font memory locations containing bit representations of printing instructions to be loaded into the full page bit map memory; and, a data control unit for retrieving printing instructions from the full page bit map addresses generated, loading thereinto the bit representations to generate updated printing instructions, and loading the updated printing instructions into the full page bit map memory. The address control unit and the data control unit are concatenated so that for each command to load printing instructions the printing instructions are updated along an entire section of an X-axis line in a single pass.

5 Claims, 5 Drawing Sheets

HORIZONTAL LINE PROCESSOR OF DATA TO BE PRINTED DOT SEQUENTIALLY

FIELD OF THE INVENTION

This invention relates to a processor for producing print command instructions for a print engine, and more particularly to a horizontal line processor for generating a set of pixel print instructions and storing the instruction in a memory for retrieval by a print engine.

BACKGROUND OF THE INVENTION

Much work has been done in the recent years regarding the development of high-speed, high-quality data processing printers. A considerable fraction of this work has gone into the development of laser-type print engines. These print engines have a specially adapted laser with a beam that can be rapidly turned on and off to generate a raster type scan line composed of pixels, or dots, across a photoconductive surface. The adjacent scans of the laser beam are located within close proximity to each other so that when the surface is completely scanned a full, accurate depiction of the image to be produced is projected on the surface. A paper printout of the image may then be produced by conventional xerographic techniques.

The advantage of using a laser-type print engine is that the pixel density can be quite high. A laser-type print engine can produce 90,000 or more pixels per square inch of output image. This makes it possible to produce figures and characters of extremely high quality, equal to those produced by much slower conventional printers with typewriter type impacting keys. Another advantage laser printers have over conventional printers is that they are not limited to printing only the figures contained on the type keys. The laser beam may be used to form a raster image of almost any combination of pixels desired. This is a desirable feature to have on a printer when printing either a business or technical document that includes irregularly shaped figures such as graph lines or scientific symbols.

One problem with laser printing technology is that large amounts of print command data must be processed by the printing system at a very high rate of speed. This is because it is necessary for the printing system to almost simultaneously receive the output data from the processor to be printed, convert the data into pixel image form readable by the print engine, and transmit the pixel print commands in the appropriate sequence to the print engine so the laser will be activated at the appropriate times as its beam scans along the photoconductive surface.

Thus, it is necessary to provide a data controller that can properly sequence the flow of data from the main processor, convert it to print engine-readable pixel form, and transmit the pixel data to the print engine.

Currently, there are two approaches to data controller design. One approach uses a band buffer where a block of data is received by the controller, converted into pixel form, and stored in a buffer where it can be read by the print engine. A disadvantage of this system is the storage buffer is too small to store all of the pixel data necessary for some complex graph and symbol imagery. Thus, these controllers are of limited utility.

Alternatively, the data controller may have a bit memory system. These controllers are provided with at least one full page bit memory map that is representative of the data to be retrieved, and for scanning by the print engine. Processing circuitry within the data controller is required to analyze the input instruction from the main processor so as to be able to generate a set of pixel instructions readable by the print engine that are representative of the image to be printed and stores them in the bit map. The completed bit map is in effect an electrical representation of the printed image that is to be produced. When the print engine is available to accept the pixel print instructions it accesses the bit map for them and uses them as print engine commands in order to produce the desired image.

One requirement of this processing circuitry is that it be able to thoroughly and efficiently generate all the combinations of print instructions that the main processor is capable of generating and the print engine is capable of following. Some of these instructions can be rather complicated. For example, a particular program within the main processor may require a complex graph or drawing to be generated. The image generated may have a number of overlapping lines or complex shapes. When the print engine accesses the bit map to receive the pixel instructions it does so serially, that is one pixel in a line after another. Thus, the pixel representiation of the image must be fully composed on at least each scan line within the bit map before the print engine has access to the scan line. Thus, a need exists to have a processor that accepts print command data from a main processor and converts it into pixel instructions so as to generate at least one line of complete instructions that can be read by a print engine. This would allow the print engine to read the complete line so as to produce a complete scan line on the photoconductive surface, that when taken together with the other complete scan lines, would produce a representation of the image desired.

SUMMARY OF THE INVENTION

The processor described herein receives instructions which comprise addresses of a line in the bit map memory where an operation is to be performed and the starting address in that line of the operation. The processor also receives a starting address in the font memory where a character or pattern involved in the operation has been stored. The instructions to the processor also include a demand specifying the type of operation to be performed and the number of bits in the bit memory on which it is to be performed. If a masking pattern is involved, instruction further includes a description of the pattern, i.e., whether it is a line pattern or an area pattern and, if it is an area pattern, the size of each cell size of the pattern. Finally, the instructions include a specification of the manner in which new data of a font memory is to be combined with data previously stored in the affected locations in the bit map memory and also a deliniation of a clipping of the size of clipping rectangles and clipping is to be performed.

The processor retrieves a sequence of bytes from a selected line in the bit map memory and iteratively performs the operation on them until the prescribed number of bits in that line have been processed. The number of bits given in the instructions to the processor is loaded into a counter and each time the operation is performed the counter is decremented by the number of bits involved. Finally, when the counter reaches zero, the processor uses that as an indication to issue a DONE signal. The operations performed in the bit map memory are not limited to byte boundaries within the memory, but rather can begin with any bit along a line. However, the memory is accessed byte by byte and the processor, therefore, performs a novel masking operation at the beginning and the end of the selected string of bits in order to limit the effect of the command to the selected string.

The processor further includes a logic unit which provides a variety of logical combinations of data already stored in the bit map memory with new data that is to affect the same locations. The logic unit may thus perform such functions as masking of previously written data and overstriking of previously printed characters with other characters.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF THE PREFERRED EMBODIMENTS

Figure 1:
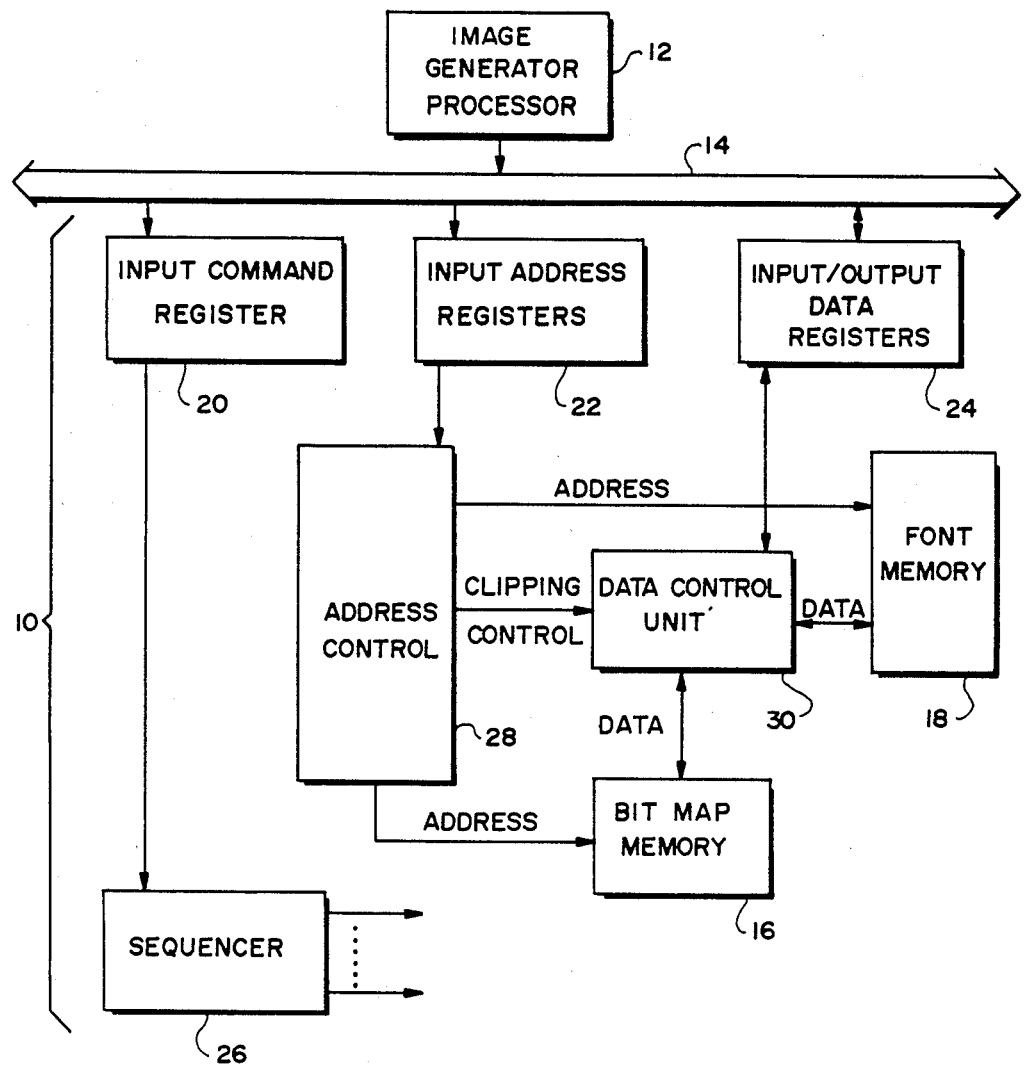
FIG. 1 is a block diagram of the preferred embodiment of a horizontal line processor constructed in accordance with the present invention.

As shown in FIG. 1 a horizontal line processor 10 receives its input commands and data from an image generator processor 12 with which it communicates over an input/output bus 14. The processor 10 includes a bit map memory 16 which it loads, line by line, with a succession of bits. When the bit map is composed, the bits are retrieved from the memory 16 by a print engine (not shown) that uses them as print instruction commands. Specifically, each bit within the bit corresponds with the position of a dot or pixel on the ultimate printed page and the logical value of each bit, i.e., 0 or 1, that indicate whether the print engine is to print a dot in that dot position. The processor 10 also includes a font memory 18 which stores in bit by bit form, a collection of characters that can be stored in the bit map memory 16 and a set of patterns, also stored in bit by bit fashion, which can be used in masking input data received by the processor 10 to provide a half-tone representation of such data in the memory 16.

More specifically, the processor 10 includes an input command register 20 that receives composition commands from the image generator processor 12, and input address registers 22 that receive addresses for both the bit map memory and the font memory 18. The data received from the processor 12 include various parameters relating to the commands executed by the processor 10 as well as information to be loaded into the font memory 18 and, in some cases, bit representations that are loaded directly from the processor 12 into the bit map memory 16. The commands loaded into the register 20 are applied to a sequencer 26 which, in response to the respective commands, controls the operation of other units in the processor 10. An address control unit 28 receives inputs from the address registers 22 and, in response, generates addresses for access to the memories 16 and 18. In addition, a data control unit 30 is provided that directs data to and from the memories 16 and 18 and also processes data that is loaded into the bit map memory 16. The data control unit 30 receives input data from the registers 24 and transmits output data to these registers. The unit 30 receives clipping control information from the address control unit 28 that prevents commands issued to the sequencer 26 from being carried out within certain defined areas in the bit map memory 18 or, alternatively, restricts commands to those areas.

Figure 2:
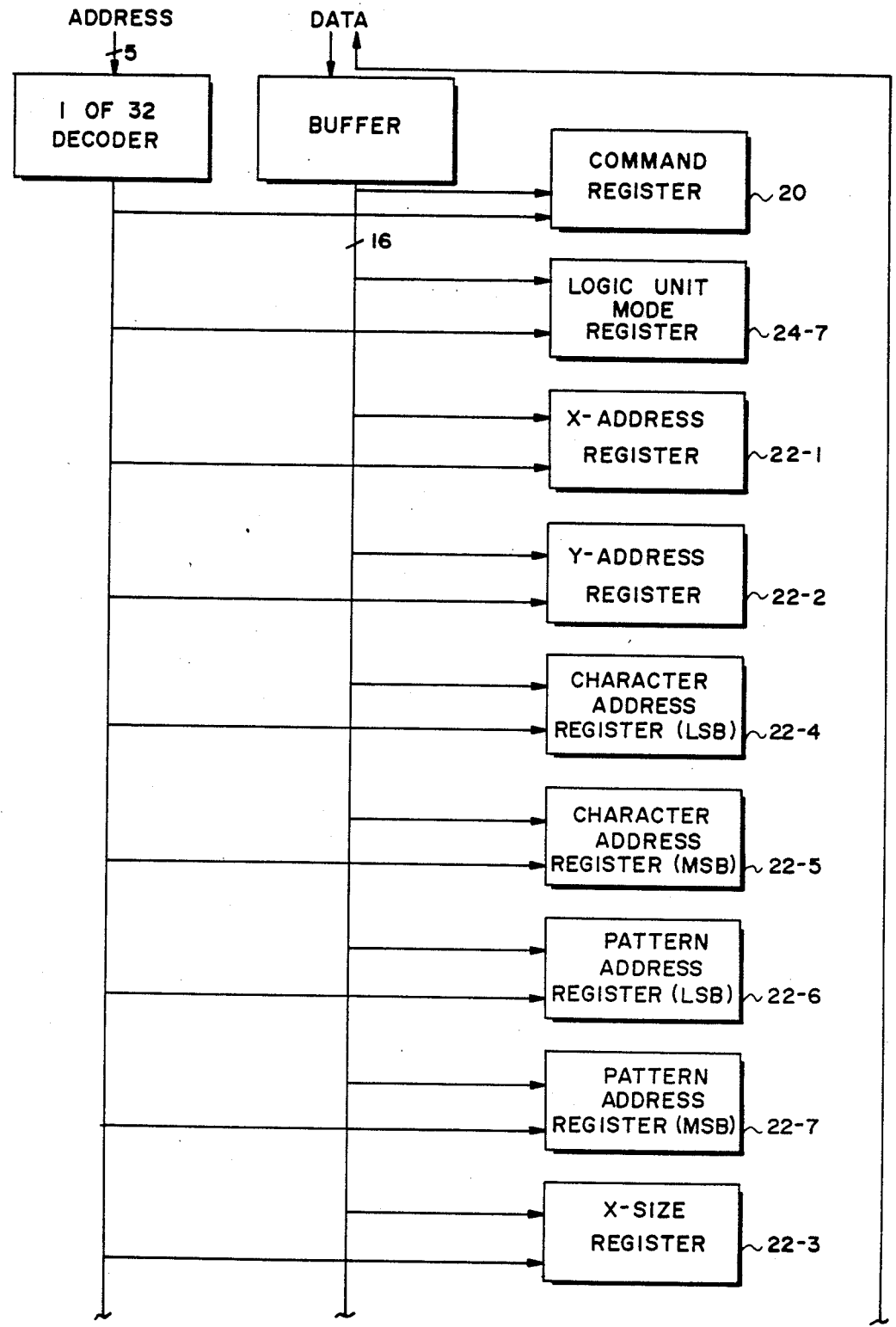
FIG. 2 is a block diagram of the address and data registers shown in FIG. 1.
Figure 2:
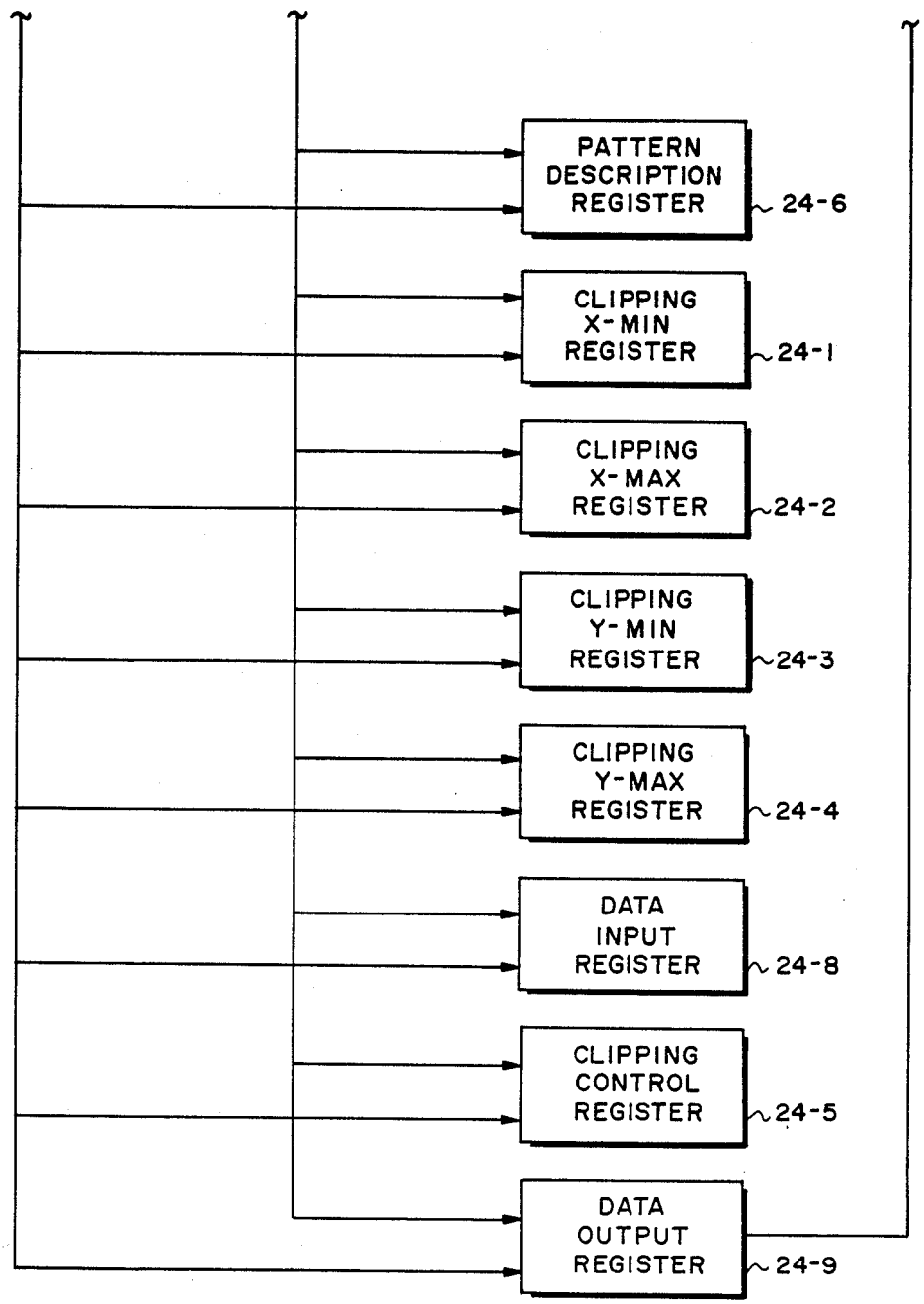

The various address registers 22 and data registers 24 are shown in more detail in FIG. 2. Before proceeding with a discussion of the contents of these registers, it would be well to understand the organization of the bit map memory 16 and font memory 18. The bit map memory is organized in X-Y fashion as each location in the memory and corresponding location of the printed page being defined by the combination of an X address and a Y address. The font memory 18, on the other hand, is organized linearly. Thus, while it has physical rows and columns characteristic of random access memories the data contained in it is organized linearly and conceptually is addressed by a concatenation of most significant bytes which, physically, may represent X and Y addresses in the memory. Thus, the scan lines of a character stored in the memory 16 are stored in consecutive locations as defined by the concatenated address. The same is true of patterns stored in the font memory 18.

The address registers 22 include the following:

an X-address register 22-1 for storing an X address in the bit map memory 16 at which a command stored in a command register 20 is to be executed;

a Y-address register 22-2 for storing a Y address in the bit map memory 16 at which the command is to be executed;

an X-size register 22-3 for storing the number of consecutive X addresses in the memory 16 upon which the command is to operate;

two character address registers 22-4 and 22-5 containing the least and most significant bytes, respectively, of an address of a character whose bit representation is contained in the font memory 18 two pattern address registers 22-6 and 22-7 for storing the least and most significant bytes, respectively, of an address of a pattern in the font memory 18 to be used in connection with a command loaded into the register 20.

The data registers 24 include clipping, X-men, X-max, Y-min and Y-max registers 24-1 - 24-4 which define the boundaries in the font memory 18 of a rectangle in which "clipping" is to take place. The data registers 24 also include:

a clipping control register 24-5 whose contents indicate the clipping mode, i.e., normal clipping, reverse clipping or no clipping;

a pattern description register 24-6 whose contents indicate the structure and size of a pattern to be overlayed on the data stored in the bit map memory 16;

a logic unit mode register 24-7 defining the operations of the data control unit 30 in carrying out a command stored in the register 20;

a data input register 24-8 that is loaded with data to be transmitted directly from the image generator processor 12 (FIG. 1) to the bit map memory 16 or font memory 18; and a data output register 24-9 that is loaded with data to be transmitted from the horizontal line processor 10 to the image generator processor 12.

Figure 3:
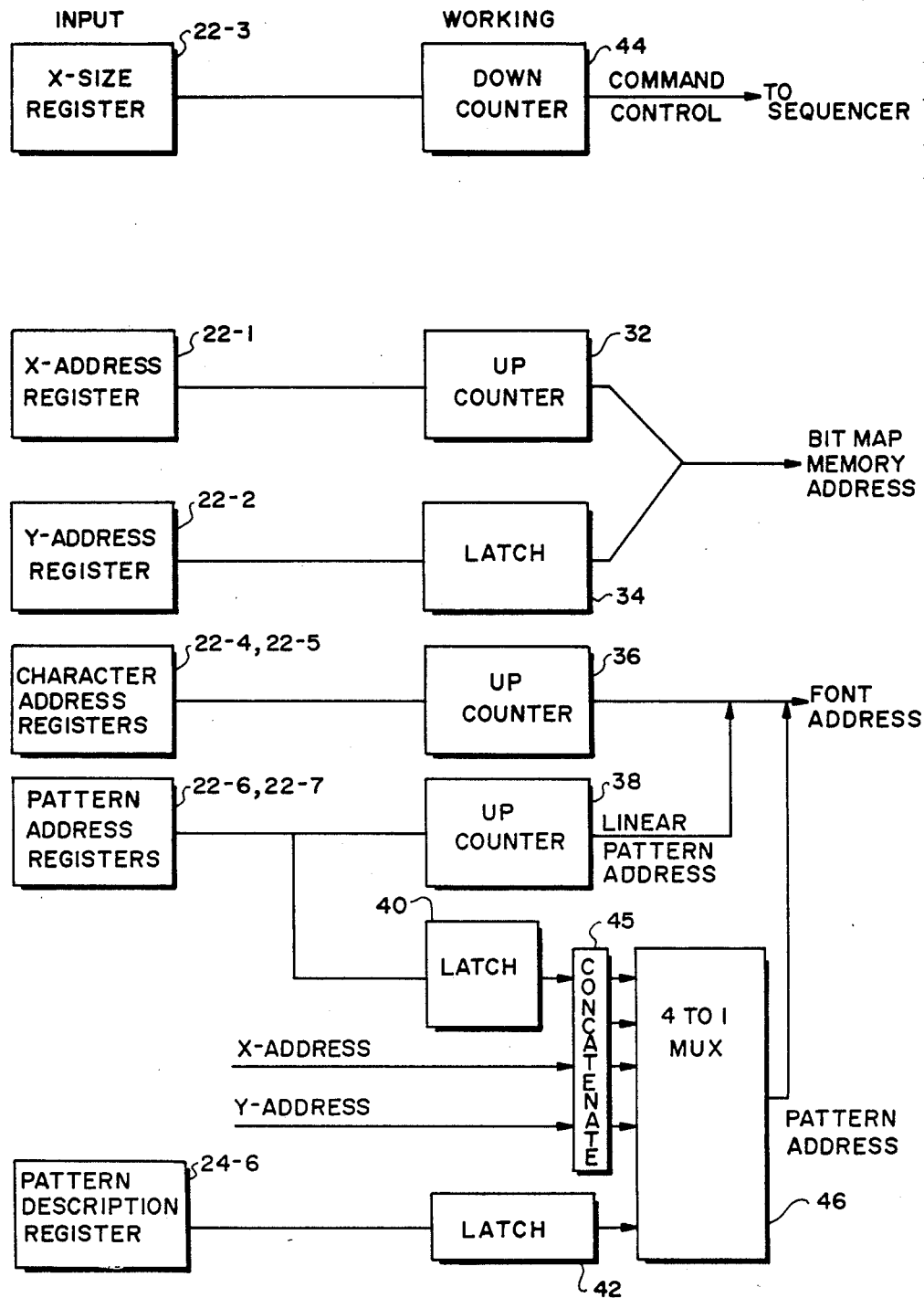
FIG. 3 is a block diagram of the address control unit shown in FIG. 1.

The various input registers in FIG. 2 are loaded sequentially over the bus 14. However, the contents of many of them are used more or less in parallel by the horizontal line processor 10. Therefore, their contents are transferred in parallel to a second set of registers and counters, which may be termed "working" registers, after which the image generator processor 12 can commence the loading of the input registers 22 for the next command. This arrangement is shown in FIG. 3 in connection with the various registers used in adjusting the memories 16 and 18. Thus, the contents of the X-address register 22-1 are loaded into an up counter 32 and the contents of the Y-address register 22-2 are loaded into a latch 34. The contents of the counter 32 and latch 34 are concatenated as shown to provide an address for access for the bit map memory 16. The contents of the address registers 22-4 and 22-5 are transferred to an up counter 36 which provides an address for the font memory 18 from which a bit representation of a character is to be retrieved. The contents of the pattern address registers 22-6 and 22-7 are loaded into an up counter 38 and a latch 40. The contents of the counter 38 are used in addressing the font memory 18 when a linear pattern is to be retrieved. The latch 40 is used in an arrangement to be described below for retrieval of area patterns from the font memory 18. The contents of the pattern description register 24-6 are transferred to a latch 42, also used in generating the address of an area pattern. The contents of the X-size register 22-3 are transferred to a down counter 44.

The arrangement of the various counters and other circuitry shown in FIG. 3 stems from the fact that a command issued to the horizontal line processor 10 may require operation upon a number of successive bytes in the bit map memory 16, the total number of bits involved in the operation being contained in the X size register 22-3. Accordingly, the horizontal line processor 10 performs an iterative operation involving successive bytes in the font memory 18 and in the bit map memory 16. With each iteration, the counter 32 is incremented to provide the next address in the bit map memory 16 and the counters 36 and, or 38 are incremented for successive accesses into the font memory 18. At the same time, the counter 44 is decremented by the number of bits in the bit map memory involved in each of the iterations so that the contents of that counter indicate the number of bits remaining to be modified. Thus, the contents of the counter 44 will reach zero at the end of a command (except for commands involving direct loading into or retrieval from the memory 16). The contents of the counter 44 are used by the sequencer 26 (FIG. 1) in issuing a DONE signal to the image generator processor 12, indicating that a command has been completed.

With further reference to FIG. 3, area patterns are, as noted above, rectangular masking patterns. That is, each of these patterns applies to a rectangle in the bit map memory 16. However, each pattern is stored linearly in the font memory 18. For example, assume a pattern which is a 16 bit by 16 bit rectangle. In bit map terms, the pattern will consist of 16 lines, each of which is 2 bytes long. Thus, in the font memory this pattern would be stored with the first 2 bytes of the first line in the pattern followed by the first 2 bytes of the second line and so on. The address contained in the latch 40 is the address of the first byte in this string. The selected bits from the latch 40 and the X and Y addresses concatenated in a set of concatenating circuits 45 in accordance with the pattern table shown below. A multiplexor 46 selects among these concatenating circuits in accordance with the contents of a latch 42 containing a code for the pattern description. The output of the multiplexor 46 is the area pattern address.

In this connection should be noted that the boundaries of a pattern have a fixed relationship to the positions within the bit map memory 16. That is, conceptually, the bit map memory is filled with repetitive overlays of the pattern, the first one beginning in the upper left hand of the memory 16, the next one immediately to the right and so on across the memory 16. The next row of pattern cells is immediately below and contiguous with the first row and so on in the Y direction of the memory. Thus, from the X and Y coordinates of a byte in the bit map memory one can determine which byte of a pattern cell is to be overlaid on the bit map pattern. Therefore, the concatenated parts of the X and Y address in the memory 16, in conjunction with the pattern address provide the address of each pattern byte to be retrieved. This arrangement is set forth in the table below:

| Pattern Size | Bits Selected, effective Font Memory Address | | |
|---|---|---|---|
| 16 × 16 | a19–a5, | y3–y0, | x3 |
| 32 × 32 | a19–a7, | y4–y0, | x4–x3 |
| 64 × 64 | a19–a9, | y5–y0, | x5–x3 |
| 128 × 128 | a19–a11, | y6–y0, | x6–x3 |
| where: aN = Pattern Address Register bit N | | | |
| yN = Y address bit N in memory 16 | | | |
| xN = X address bit N in memory 16 | | | |

Figure 4:
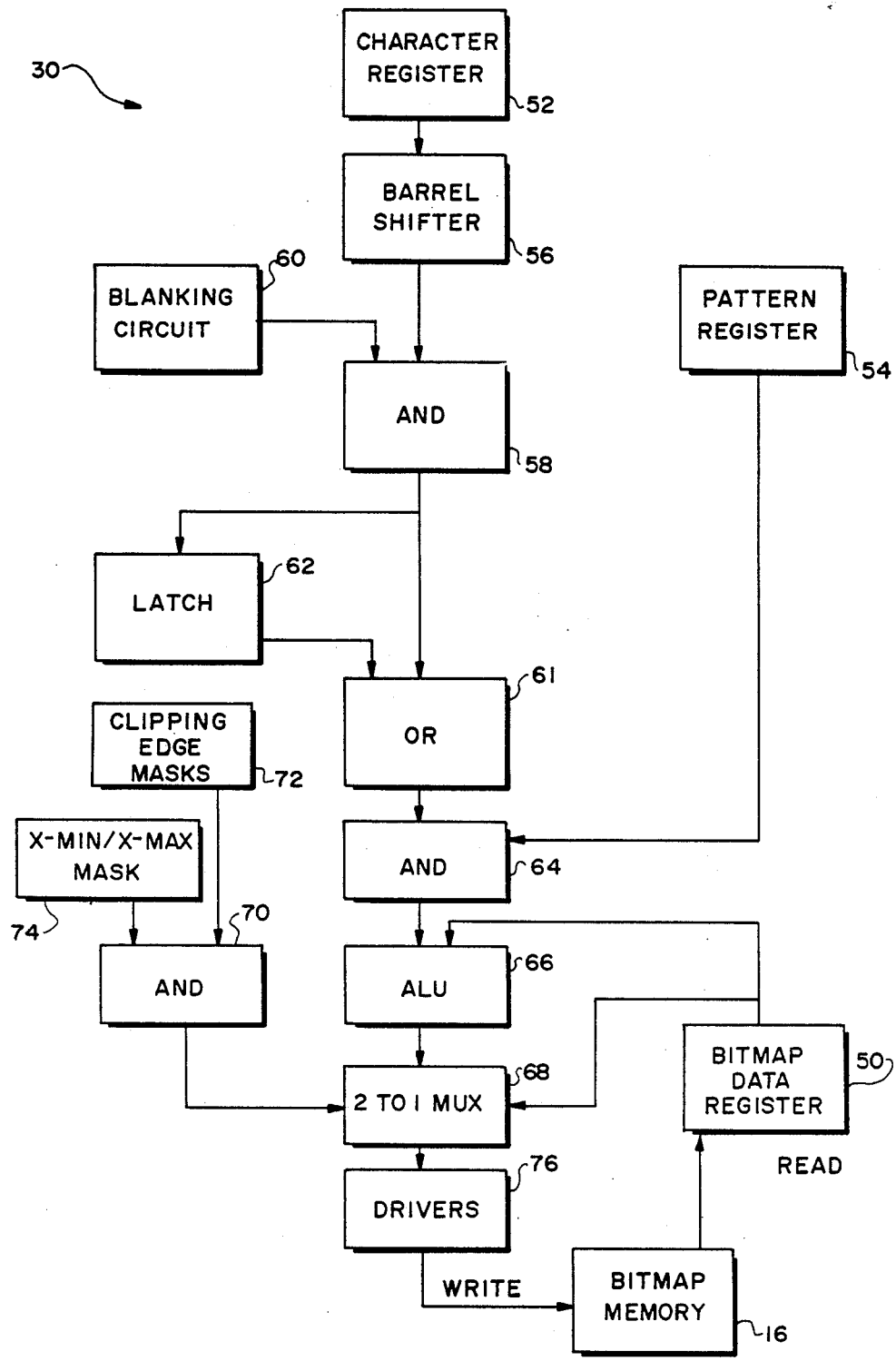
FIG. 4 is a block diagram of the data control unit shown in FIG. 1

The data control unit 30 is shown in FIG. 4. The contents of a byte location in the bit map memory 16 where an operation is to be performed are retrieved from that memory and loaded into a bit map data register 50. Also, if a portion of a character is to be loaded into that bit map location, the corresponding byte is retrieved from the font memory 18 and loaded into a character register 52. If a portion of a pattern is to be overlaid on the bit map location a corresponding pattern byte is retrieved from the font memory 18 and loaded into a pattern register 54.

Assume first that the command being executed by the horizontal line processor 10 involves a character. A character may have any arbitrary location within the bit map memory. Thus, the representation of the character retrieved from the memory 18 will in general not coincide with a byte retrieved from the bit map memory 16. The 3 significant bits of the X address received by the register 22-1 (FIG. 2) indicate the starting position of the command within the byte retrieved from the memory 16 and now contained in the register 50. These 3 bits are applied to a barrel shifter 56 which receives the byte contained in the character register 52 and rotates it by the indicated number of bits. Thus, if the command is to begin with the third bit position in the byte contained in the register 50, the shifter 56 rotates or shifts the byte from the register 52 by two bits so that the least significant 2 bits of the byte have been shifted to the left end of the shifter and the most significant 6 bits are on the right. The contents of the shifter 56 are applied to an AND circuit 58, whose other input is the output of a blanking circuit 60, which blanks out the left most 2 bits. After processing by the AND circuit 58, the buite passes through an OR circuit 61 whose other input at this time is a byte of zeros from a latch 62. The output of the OR circuit 61 is combined in an AND circuit 64 with the contents of the pattern register 54. The result is passed to an arithmetic logic unit 66. The logic unit 66 logically combines the contents of the register 50 containing bit map data and the output of the AND circuit 64 in accordance with the logic unit mode received in the register 24-7 (FIG. 2). For example the purpose of the command may be to overstrike a character in the map memory 16 with a character retrieved from the font memory 18.

The output of the logic unit 66 is applied to a multiplexor 68, which also receives the contents of the bit map data register 50. The multiplexor 68 is conceptually a set of 8 multiplexors, one for each bit position. Each of these multiplexors is controlled by a corresponding one of the outputs of an AND circuit 70 whose inputs are derived from the clipping edge mask indicated at 72 and a draw line mask indicated at 74. The draw line mask 74 includes an X-min mask and X-max mask. The X-min mask relates to the beginning position of a command thus in the present example masks out the first two bits of the byte representation previously retrieved, provides an input to the AND circuit 70 that causes the multiplexor 68 to select the most significant 2 bits from the bit map register 50 and the remaining 6 bits from the logic unit 66. The output of the multiplexor 68 is then fed through a set of drivers 76 to the correct addresses of the bit map memory 16.

Next, the blanking circuit 60 masks out the right most 6 bits of the contents of the barrel shifter 56 and the latch 62 is strobed to receive the output of the AND circuit 58. The latch 62 thus contains the left most 2 bits of the content of the barrel shifter 56 followed by 000000. The next byte from the font memory 18 is loaded into the character register 52 and again it is rotated by 2 bits in the barrel shifter 56. The blanking circuit 60 then blanks out the left most 2 bits of the barrel shifter so that the AND circuit 58 passes the right most 6 bits. The OR circuit 61 then receives a full byte, i.e., the left most 2 bits from the latch 62 and the right most 6 bits from the AND circuit 58. As the character bits pass on to the logic unit 66, where they are combined with the contents of the register 50, as described above and the output of the logic unit 66 again reaches the multiplexor 68. In this case, the X-min function is disabled and the multiplexor 68 passes the entire byte from the logic unit 66 to the bit map memory 16.

With each of the foregoing operations, the down counter 44 (FIG. 3) is decremented by the number of bits from the bit map memory 16 used in each operation, i.e., 6 bits in the first operation and 8 bits in the second operation. The sequence continues until the counter 44 has reached a count of zero. Assuming that the operation does not end on a byte boundary, the bit map register 50 will contain some number of bits. Assume, for example, that the 3 rightmost bits remain in the register 50 and are not to be affected by the command presently being executed by the horizontal line processor. This number having been calculated, the max-mask is appropriately configured and switched on to the AND circuit 70. As a result, the multiplexor 68 selects the left most 3 bits from the logic unit 66 and the right most 3 bits from the data register 50.

The operation of the clipping edge mask 72 is similar to that of the X-min and X-max masks 74. The clipping edge mask includes a left edge, a right edge mask and top and bottom masks. In the map bytes containing the left and right edges of a clipping mask, the masks make use of the least 3 significant bits of the X-address a manner similar to that of the X-min and X-max masks. At all other times, the output of the selected clipping masks is a full byte of either zeros or ones.

What is claimed as new and desired to be secured by Letters Patent of the United States is:

1. A horizontal line processor for loading print instruction commands into a full page bit map memory having addressable locations arranged in an X-Y pattern, each of the print instruction commands comprising a retrievable display means instruction for a page location corresponding to the full page bit map memory location the command is located in, the horizontal line processor comprising:

A. a font memory for storing bit representations of print instruction commands, for individual images, each set of bit representations for an image stored together in byte form, said bytes containing said bit representations for an individual image stored together and locatable by the first byte in said font memory containing said bit representations for the image;

B. means for receiving commands to load print instruction commands into said full page bit map memory, and in response thereto, re-transmitting same, each of said commands comprising:
 1. a command specifying a type of operation to be performed on the print instructions stored in the full page bit map memory;
 2. an address of a selected Y-location in said full page bit map memory in which said operation is to be performed;
 3. a starting address on said selected Y-location line in said full page bit map memory at which said operation is to be performed;
 4. a starting address in said font memory of said first bite containing bit representations of an image to be retrieved therefrom; and
 5. a number representative of the length of said selected Y-location line in said full page bit map memory on which said instruction is to be loaded;

C. a sequencer means for generating a set of sequencer command instructions in response to receiving said operation command instructions and a LINE-DONE signal;

D. an address control unit receiving said sequencer command instructions, said selected Y-location address, said Y-location starting address, said font memory first byte starting address, and said number representative of line length, and, in response thereto, generating and sequentially incrementing selected addresses, along one Y-location line at a time, in the full page bit map memory where print instructions are to be loaded, generating and sequentially updating addresses in said font memory where said bit representations of printing instructions are located, and each time said address to the full page bit memory is incremented, decreasing by one said member representative of the length on said Y-line, until said number reaches zero and then generating said LINE-DONE signal; and E. a data control unit receiving said sequencer command instructions, the print instructions in said full page map memory address locations generated by said address control unit, said bit representations of printing instructions in said font memory address locations generated by said address control, and at least a portion of said Y-location line starting address, and, in response thereto, selectively combining the contents of said retrieved printing instructions and said bit representations in response to said Y-location line starting address so as to generate an updated set of printing instructions and writing said updated printing instructions into the selected location in said full page bit map memory.

2. The horizontal line processor of claim 1 further including:

said font memory storing bit representations of characters to be loaded into the full page bit memory, said character bit representations stored in a byte-by-byte arrangement in said font memory;

said address control unit sequentially identifying said byte locations in said font memory where said character bit representations bytes are stored so that the bit representations stored in said bits are sequentially forwarded to said data control unit; and said data control unit receiving said byte containing said character bit representations, shifting the location of the bit representations in said byte in response to said portion of said Y-location line starting address received, and selectively combining the retrieved printing instructions with said character bit representations to generate said updated printing instructions.

3. The horizontal line processor of claim 2 further including:

said font memory storing bit map representations of a set of area patterns to be overlaid over said characters, said area pattern bit representations stored in a byte-by-byte pattern in said font memory;

said address control unit sequentially identifying said byte locations in said font memory where said pattern bit representations are stored so that said bit representations are sequentially forwarded to said data control unit; and said data control unit receiving said area pattern bit representations and combining same with said shifted character byte representations prior to combining said character byte representions with said retrieved printing instructions.

4. The horizontal line processor of claim 3 further including said address control unit concatenating said line address and said address on said line with a pattern address to generate an address identifying said bytes of said area pattern bit representations to be received.

5. The horizontal line processor of claim 3 further including said area pattern bit representations providing print instruction commands that, when combined with said character bit representations provide print instruction commands that can generate half-tone representations of characters represented by said character bit representations.

* * * * *